United States Patent
Sartore

(10) Patent No.: US 9,244,836 B2
(45) Date of Patent: Jan. 26, 2016

(54) FLASH MEMORY ORGANIZATION FOR REDUCED FAILURE RATE

(75) Inventor: Ronald H. Sartore, Poway, CA (US)

(73) Assignee: AgigA Tech Inc., San Diego, CA (US)

( * ) Notice: Subject to any disclaimer, the term of this patent is extended or adjusted under 35 U.S.C. 154(b) by 760 days.

(21) Appl. No.: 12/624,348

(22) Filed: Nov. 23, 2009

(65) Prior Publication Data

US 2011/0125953 A1     May 26, 2011

(51) Int. Cl.
| | | |
|---|---|---|
| *G06F 12/02* | (2006.01) | |
| *G06F 12/06* | (2006.01) | |
| *G06F 3/06* | (2006.01) | |

(52) U.S. Cl.
CPC .......... *G06F 12/0638* (2013.01); *G06F 3/0616* (2013.01); *G06F 3/0646* (2013.01); *G06F 3/0679* (2013.01); *G06F 12/0246* (2013.01); *G06F 2212/7208* (2013.01)

(58) Field of Classification Search
CPC ............ G06F 12/0246; G06F 12/0638; G06F 3/0614; G06F 3/0616; G06F 3/0646; G06F 3/0677; G06F 3/0689; G06F 2212/1036; G06F 2212/7208
See application file for complete search history.

(56) References Cited

U.S. PATENT DOCUMENTS

| | | | | |
|---|---|---|---|---|
| 4,276,609 | A * | 6/1981 | Patel | 711/104 |
| 4,722,085 | A * | 1/1988 | Flora et al. | 714/770 |
| 5,680,579 | A * | 10/1997 | Young et al. | 711/157 |
| 6,539,048 | B2 * | 3/2003 | Hakala | 375/143 |
| 7,856,528 | B1 * | 12/2010 | Frost et al. | 711/114 |
| 2001/0003837 | A1 * | 6/2001 | Norman et al. | 711/5 |
| 2002/0040429 | A1 * | 4/2002 | Dowling | 712/228 |
| 2003/0188086 | A1 * | 10/2003 | Singh | 711/104 |
| 2004/0268063 | A1 * | 12/2004 | Lasser | 711/154 |
| 2005/0114587 | A1 * | 5/2005 | Chou et al. | 711/103 |
| 2007/0233939 | A1 * | 10/2007 | Kim | 711/103 |
| 2009/0157964 | A1 * | 6/2009 | Kasorla et al. | 711/118 |
| 2011/0040926 | A1 * | 2/2011 | Frost et al. | 711/103 |

OTHER PUBLICATIONS

Malek, M. "Dependable Systems 9. Redundant arrays of inexpensive disks (RAID)," 2004, pp. 11-13.*
Free Merriam-Webster Dictionary, Definition of word, retrieved from www.merriam-webster.com/dictionary/word.*
WestNew IT Glossary, Definition of word, retrieved from glossary. westnetinc.com/term.php?termId=1596.*
Ekker, et al. "Solid State Storage 101 An introduction to Solid State Storage." SNIA Solid State Storage Initiative, Jan. 2009.*

* cited by examiner

*Primary Examiner* — Michael Krofcheck
(74) *Attorney, Agent, or Firm* — FSP LLC

(57) ABSTRACT

A memory system distributes across multiple pages of a flash memory bits of a DRAM data word, the data word having a number of bits equal to a width of a row of a DRAM memory, and the bits of the data word all from a same row of the DRAM memory.

14 Claims, 8 Drawing Sheets

FIG. 7

FLASH MEMORY ORGANIZATION FOR REDUCED FAILURE RATE

TECHNICAL FIELD

The present disclosure relates to machine memory technology.

BACKGROUND

Flash memory technologies provide large amount of inexpensive solid state digital memory storage, but in some instances suffer from higher failure rates than other memory technologies. Flash memories may be organized into pages. For example, each page may be 2048 bytes, e.g. two kilobytes. The pages may be organized into blocks. For example, one block may contain sixty-four pages. When a page catastrophically fails, due to physical exhaustion of the storage capability for example, it may be difficult or impossible to reconstruct and recover the data for the failed page. This may be the case even when the storage data comprises error-correcting codes, which under certain circumstances enables data to be recovered even when a few bits are incorrectly stored, e.g. corrupted.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 7 is an illustration of an embodiment of the mapping of a RAM memory organization to a flash memory organization.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

Hybrid Memory Subsystem

Figure 1:
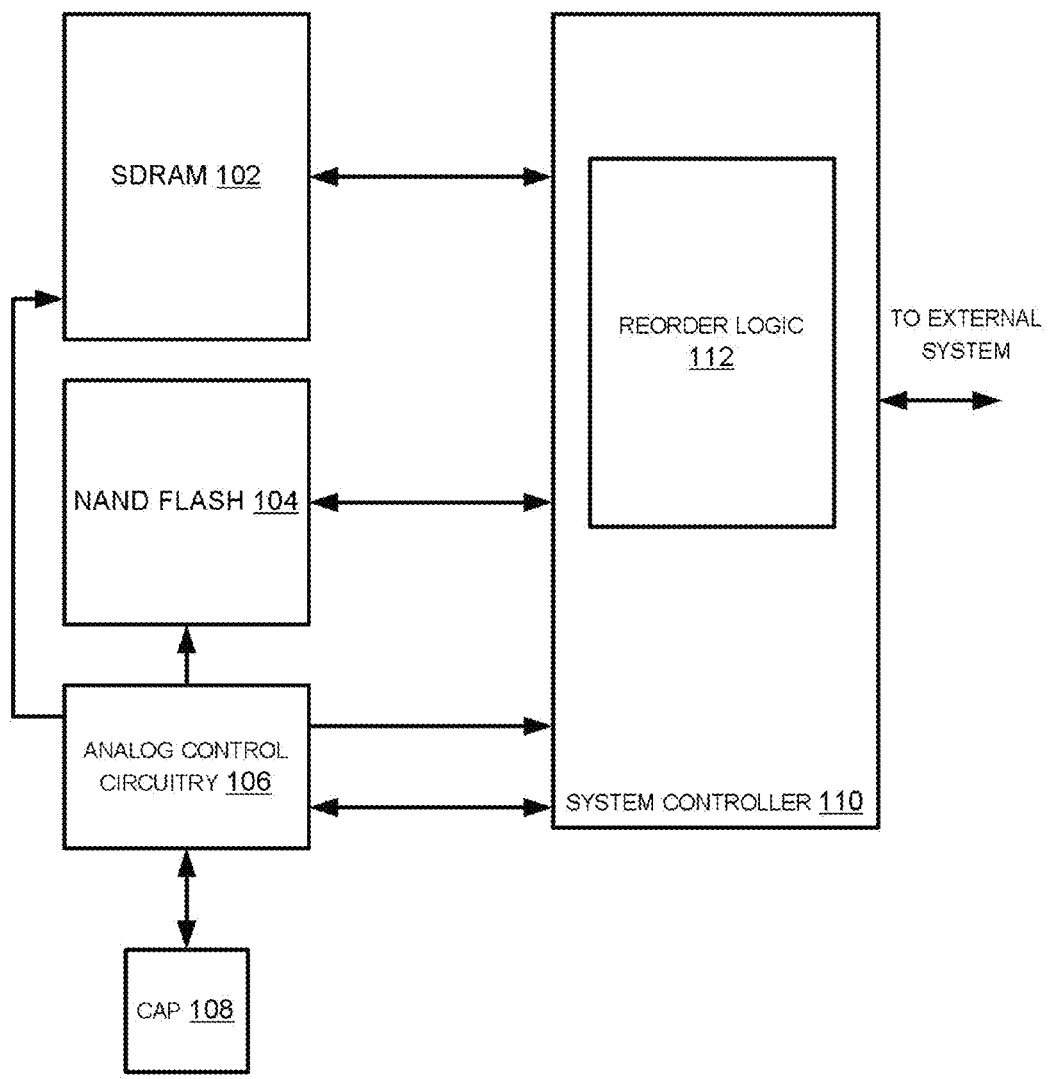
FIG. 1 is a block diagram of an embodiment of a hybrid memory subsystem.

FIG. 1 is a block diagram of an embodiment of a hybrid memory subsystem. The subsystem provides a low-cost, high density, non-volatile memory by using a low-cost volatile memory 102 in conjunction with a low-cost non-volatile memory 104.

The memory subsystem includes, but may not be limited to, SDRAM 102 (volatile memory), NAND FLASH 104 (nonvolatile memory), analog power control circuitry 106, power capacitor 108, and a system controller 110. Other elements and/or couplings among the elements may be apparent to skilled practitioners in the relevant art(s).

The volatile memory in this embodiment is an SDRAM 102 (Synchronous Dynamic Random Access Memory). Other types of volatile random access memory may also be used. The nonvolatile memory in this embodiment is a NAND FLASH 104, and again, other types of nonvolatile memory may be used.

The analog power control circuitry 106 interfaces the memory subsystem to an external power source, typically the power source of a larger system that incorporates and uses the hybrid memory subsystem. For example, the external power source may be supplied by a personal or business computer system that incorporates the memory subsystem.

The analog power control circuitry 106 also interfaces the memory subsystem to a backup power source that is local to the memory subsystem. The backup power source may be, for example, a capacitor 108 or small battery (or a combination of the two). In the embodiment of FIG. 1, a capacitor 108 provides power to the memory subsystem for a temporary time when external power fails. The capacitor 108 may provide power for long enough to copy data from volatile memory 102 to nonvolatile memory 104.

In the event of an external power failure, the hybrid memory subsystem may operate as an isolated subsystem of the larger, external system. The analog power circuitry 106 may recognize that external system power has failed. The system controller 110 may then initiate backup of data currently stored in the volatile memory 102 into the non-volatile memory 104. Herein, the term "backup" means that data of the volatile memory 102 is stored into the nonvolatile memory 104. Upon restoration of external system power, the system controller 110 may initiate restoration of backed-up data from non-volatile memory 104 to volatile memory 102. Herein, the term "restore" and "restoration" means that data of the nonvolatile memory 104 is stored into the volatile memory 102.

The system controller 110 may thus include logic to backup data from volatile memory 102 to nonvolatile memory 104 when the external power source fails, and to restore data from nonvolatile memory 104 to volatile memory 102 when the external power source becomes available.

Those skilled in the art will appreciate that various functional components, such as the power controller logic 106 and the system controller logic 110, and even the volatile memory 102 and nonvolatile memory 104, may in fact be implemented together as one or more integrated circuit devices, and packaged as one or more discrete physical components.

Data stored within the hybrid memory subsystem persists even when the power of the external system fails. The external system may interact with the hybrid memory subsystem as though interacting with volatile memory 102 (of the same or another type), even though, transparently, the data is stored internally by the memory subsystem in nonvolatile memory 104 persistently in the absence of external system power.

The hybrid memory system may write data to non-volatile memory 104 only in the event that external system power fails. Thus, the non-volatile memory 104 undergoes many fewer write cycles than would occur if it were being written every time data were written to the hybrid memory subsystem. When the non-volatile memory 104 is a low-cost, limited life NAND FLASH, the result is an extension of the useful lifetime of the non-volatile memory 104.

The system controller 110 provides a memory interface to the external system. The memory interface may comprise a standard data and control interface for some particular kind of volatile memory. For example, the system controller may provide an SDRAM data, address, and control interface to the external system. The interface provided to the external system may or may not be the interface for the type of volatile memory 102 actually used by the memory subsystem.

The system controller 110 may additionally provide an interface whereby the external system may send commands to the hybrid memory subsystem or obtain status. For example, in some embodiments the external system may command the hybrid memory subsystem to initiate a backup of data from volatile memory 102 to non-volatile memory 104, even though the system power is still available. Additionally or alternatively, the hybrid memory subsystem or external system may provide a direct user interface, such as a switch or control on a graphic user interface, whereby a user of the external system may directly initiate a copy of data from volatile 102 to non-volatile memory 104. Another action which may in some embodiments be initiated either through the system interface of the system controller 110, or directly by a user, is restoring data from non-volatile memory 104 to volatile memory 102. In some embodiments the external system may use its system interface to the hybrid memory controller 110 to initiate a self test of the hybrid memory subsystem. The system may comprise reorder logic 112 to reorder the contents of RAM 102 before writing said content to flash 104. The reorder logic 112 is discussed in more detail, infra.

Other examples and/or embodiments of the various system components may now be apparent to skilled practitioners in the relevant art(s).

Hybrid Memory Subsystem Operation

As previously described, the system controller 110 may comprise logic to interface the volatile memory 102 to an external system, such as a personal computer system or a business computer system. Other examples of applications of the hybrid memory subsystem are embedded control applications, communications, and consumer products.

The system controller 110 may present an interface to the external system, so that the volatile memory 102 is addressable for reading and writing of data by the external system.

Logic of the power controller 106 may detect when power from the external system to at least one of the volatile and nonvolatile memories and to the controller fails. For example, the external system may suffer a power source outage or battery failure. When external system power fails, the power controller 106 may provide backup power to the volatile memory 102, nonvolatile memory 104, and to the controller 110 for long enough to enable the backup of data from the volatile memory 102 to the nonvolatile memory 104. The capacitor or battery power source 108 may act as the source of this backup power.

In some embodiments, the controller 110 may include logic to enable the external system to initiate a backup of data from the volatile memory 102 to the nonvolatile memory 104, instead of waiting for a power failure to initiate the backup. The controller 110 may also comprise logic to emulate to the external system a type of volatile memory other than its included type of volatile memory. For example, internally the memory subsystem may employ SDRAM for the volatile memory 102. However, the controller may include logic to emulate single data rate RAM (SDRAM), double data rate RAM (DDRAM), DDR2, asynchronous SRAM, C-F card, or PCI-Express (among other examples) to the external system.

The volatile memory 102, nonvolatile memory 104, controller 110, and power controller 106 may be implemented in various ways. For example, these components may be implemented as one of a multi-chip set, a board subsystem, or even a single chip.

The embodiment shown in FIG. 1 shows that backups and restores of data are implemented as data moves from the volatile memory 102 to the nonvolatile memory 104, and vice versa, via the controller 110. In other embodiments, backups and restores may be implemented via data moves from the volatile memory 102 to the nonvolatile memory 104 directly, without passing through the controller 110.

Figure 2:
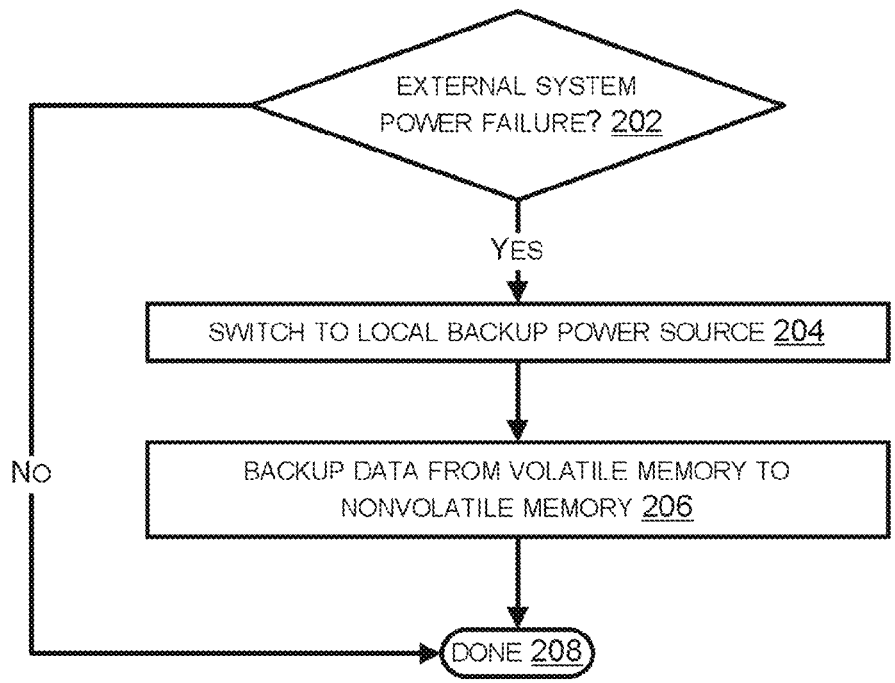
FIG. 2 is a flow chart of an embodiment of a data backup process.

FIG. 2 is a flow chart of an embodiment of a data backup process. If external system power fails (see 202), backup power from a local source, such as a capacitor, is applied to operate the memory subsystem (see 204). Data is backed up from volatile memory to nonvolatile memory, see 206. At 208 the process concludes.

The backup power source has been discussed in terms of one or more capacitors local to the hybrid memory subsystem. However, the backup power source, such as one or more capacitors, may also be provided by the external system.

The backup power source may be applied upon failure of external system power (i.e. the primary power source), which may involve some form of switching function from primary to backup power. Power switching functions inherently involve some latency (switching time), which may provide a vulnerability to losing all power to the memory subsystem if the switching function fails, or becomes too slow. Thus, in some embodiments power is always supplied to the hybrid memory subsystem via the backup power source. The hybrid memory subsystem may for example always draw power from one or more backup power capacitors, which in turn are continually recharged from external system power when such power is available. Upon external system power failure, the memory subsystem continues to draw power from the backup power capacitors, drawing down their voltage, while for example performing a power-down save of data in volatile memory 102 to nonvolatile memory 104.

Thus, the term "external system power" may refer to power from the external system as applied to the memory subsystem via one or more backup power sources, such as power capacitors. The term "backup power" may refer to power applied to the memory subsystem via the backup power sources once power from the external system fails.

The memory subsystem is thus isolated from the external system that uses it in at least two ways. First, memory access isolation is provided by interposing the controller interface 110 (which may or may not be the same as the volatile memory 102 interface) between the memory subsystem and the external system. Second, power isolation from the main system may be provided by "gating" external system power through the backup power source.

Upon restoration of external system power, logic of the controller 110 may operate to restore data from the nonvolatile memory 104 to the volatile memory 102.

Figure 3:
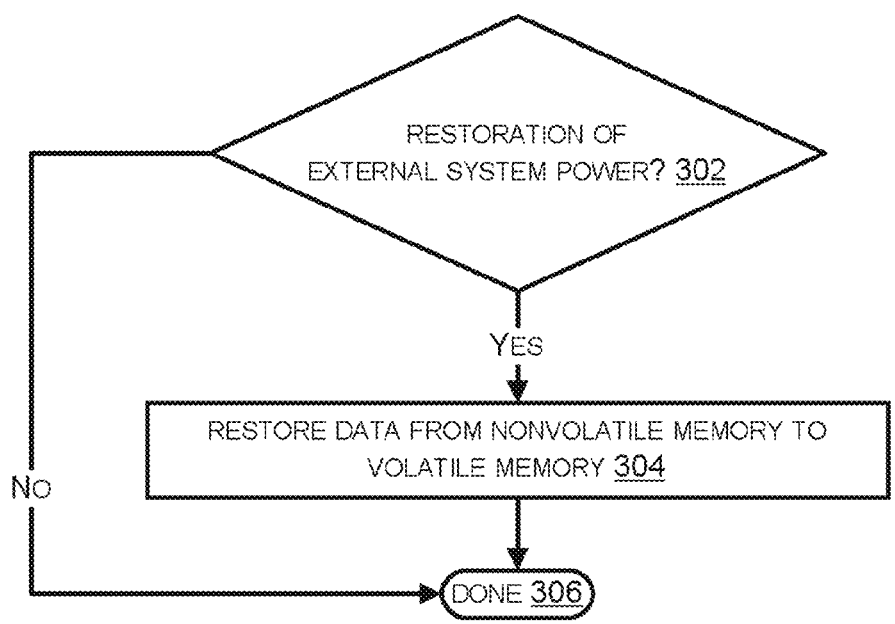
FIG. 3 is a flow chart of an embodiment of a data restoration process.

FIG. 3 is a flow chart of an embodiment of a data restoration process. At 302, if there is restoration of external system power, the analog control circuitry recognizes the power restoration. At 304, data is restored from nonvolatile memory to volatile memory. At 306 the process concludes.

A hybrid memory system may comprise volatile (e.g. DRAM) and non-volatile (e.g. flash) memory (e.g. as a backup capacity for the DRAM). In such a system, the DRAM may be seventy-two bits wide, for example sixty-four bits of data, and eight bits of error correcting code (ECC). In such a system, in a novel fashion, each bit of a DRAM memory word may be stored in different page of flash. The DRAM bits may be organized into subsets (of one or more bits per subset) where the subsets are stored across multiple pages of the flash memory. In this manner, failure of a particular flash page will not destroy the information content of any one data word stored in the flash memory. Error-correcting codes (ECCs) may be employed to enable the data to be reconstructed when only a sufficiently few bits are missing or damaged. To store a word in flash, for example a sixty-four bits word from a DRAM, a system may read sixty-four bits of data and eight bits of ECC from DRAM and serialize them into the flash memory across seventy-two different pages, for example.

Figure 4:
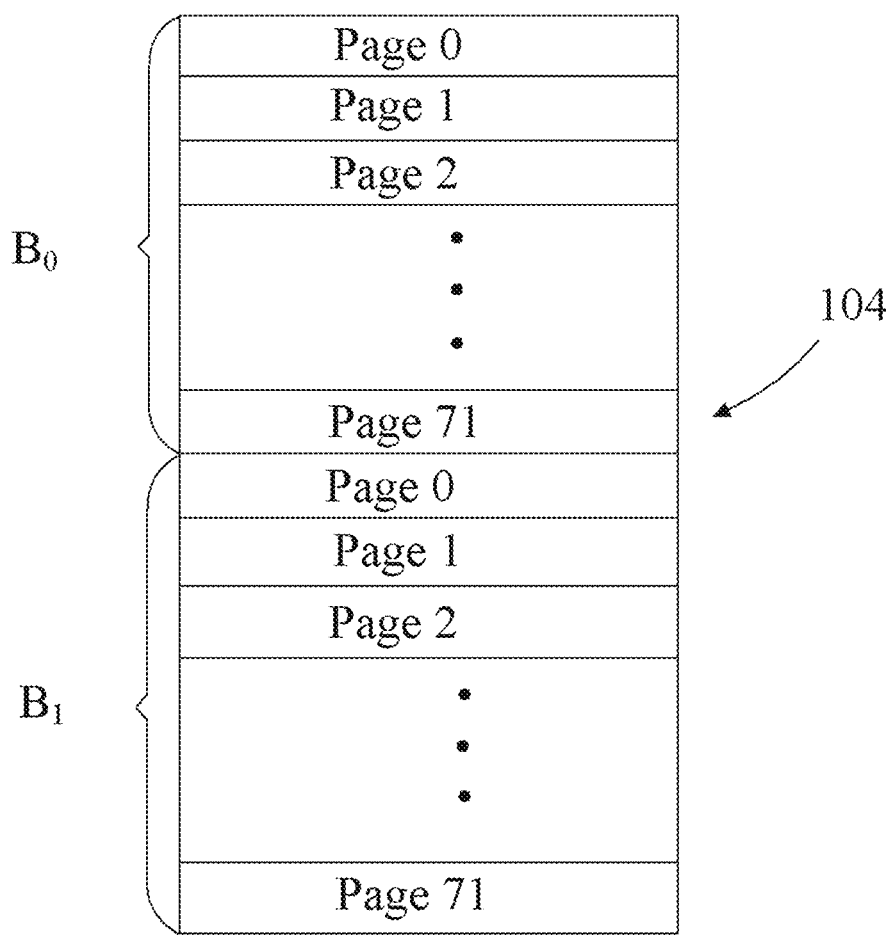
FIG. 4 illustrates an embodiment of organization of flash memory.

FIG. 4 is an illustration of an embodiment of organization of flash memory 104. The flash memory 104 may be divided in blocks $B_0$, $B_1$, etc, and the blocks further divided into pages. In one embodiment, there are seventy-two pages per block, where seventy-two is also the number of bits in a volatile memory data word in the memory system. Each flash memory page of a block stores bits from a particular position of a plurality of volatile memory data words. The number of bits that may be stored in a particular page is a function of the flash memory page size.

Figure 5:
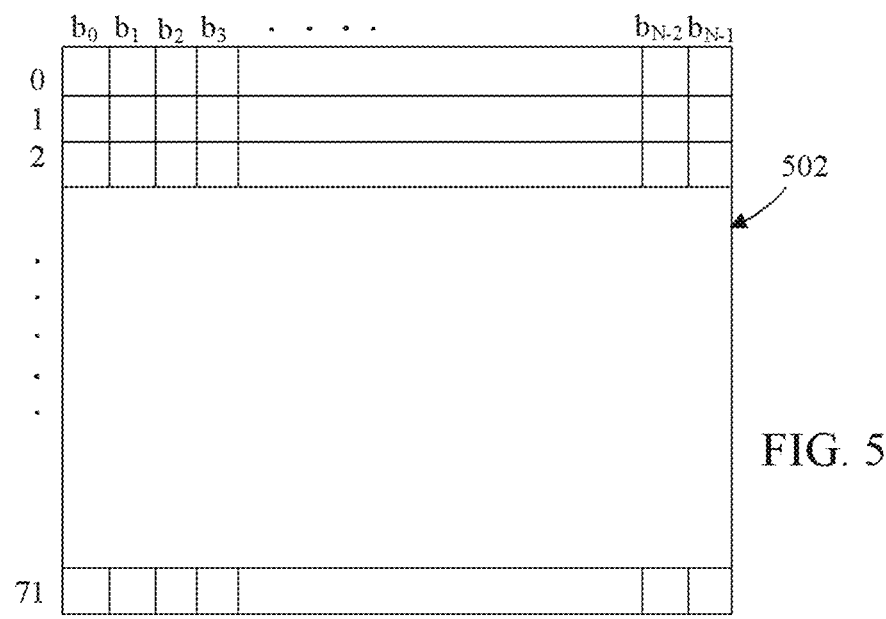
FIGS. 5 and 6 illustrate embodiments of a memory block organization.

FIG. 5 illustrates a set of seventy-two flash memory pages 502. Each page comprises bits $b_0$ through $b_{N-1}$, where N is the number of bits in a flash memory page for the implementation.

Figure 6:
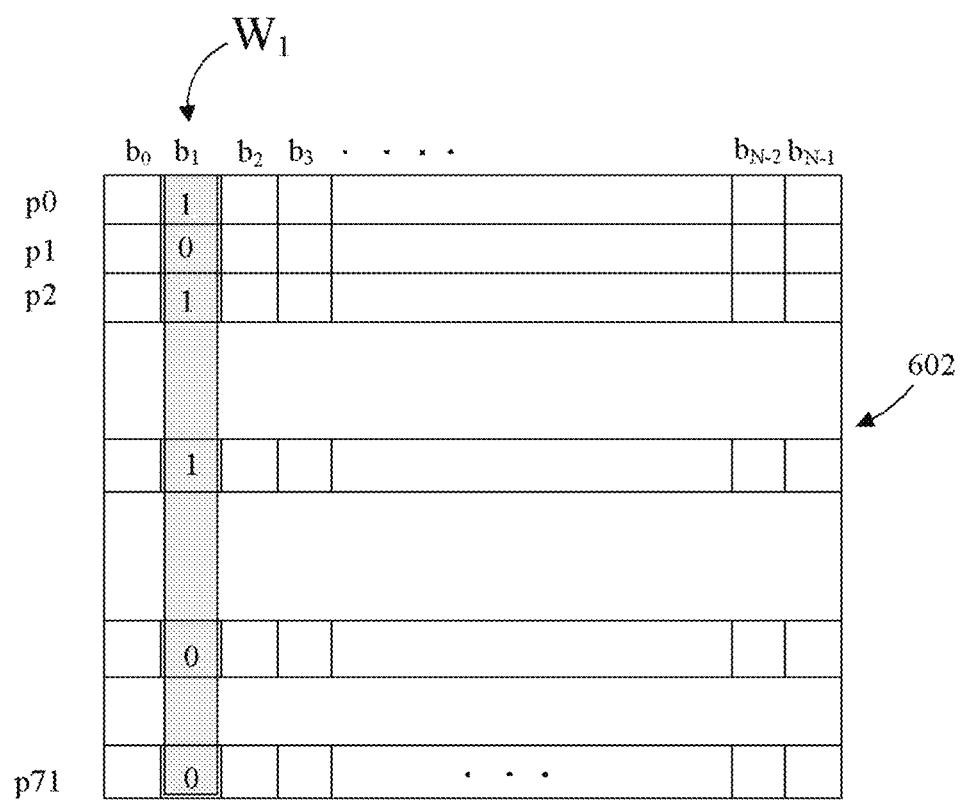

FIG. 6 is an illustration of storing a word ($W_1$) of RAM data in a collection of flash memory pages of FIG. 5. The seventy-two bit DRAM word $W_1$ may be stored across seventy-two pages of the flash memory 602. All of the bits of $W_1$ are stored in column $b_1$. Bit 0 of $W_1$ may be stored at $b_1$ page 0; bit 1 of $W_1$ may be stored at $b_1$, page 1. Bit 2 of $W_1$ may be stored at $b_1$, page 2, and so on. It's not necessary that the bits of a particular data word occupy a single column in all cases, nor do all embodiments necessarily comprise a single bit per data word per page. Nor are the bits of data word necessarily stored in sequential flash pages. Various bits of an error-correcting code (ECC) that are included with the RAM memory word $W_1$ may be interspersed throughout the flash pages, or may be stored contiguously at some point, for example, in the last eight flash pages of the block. The data bits and the error-correcting code bits may thus be distributed across multiple flash pages. Failure of any single page or even multiple pages may not irreparably destroy any one of the stored data words.

Figure 7:
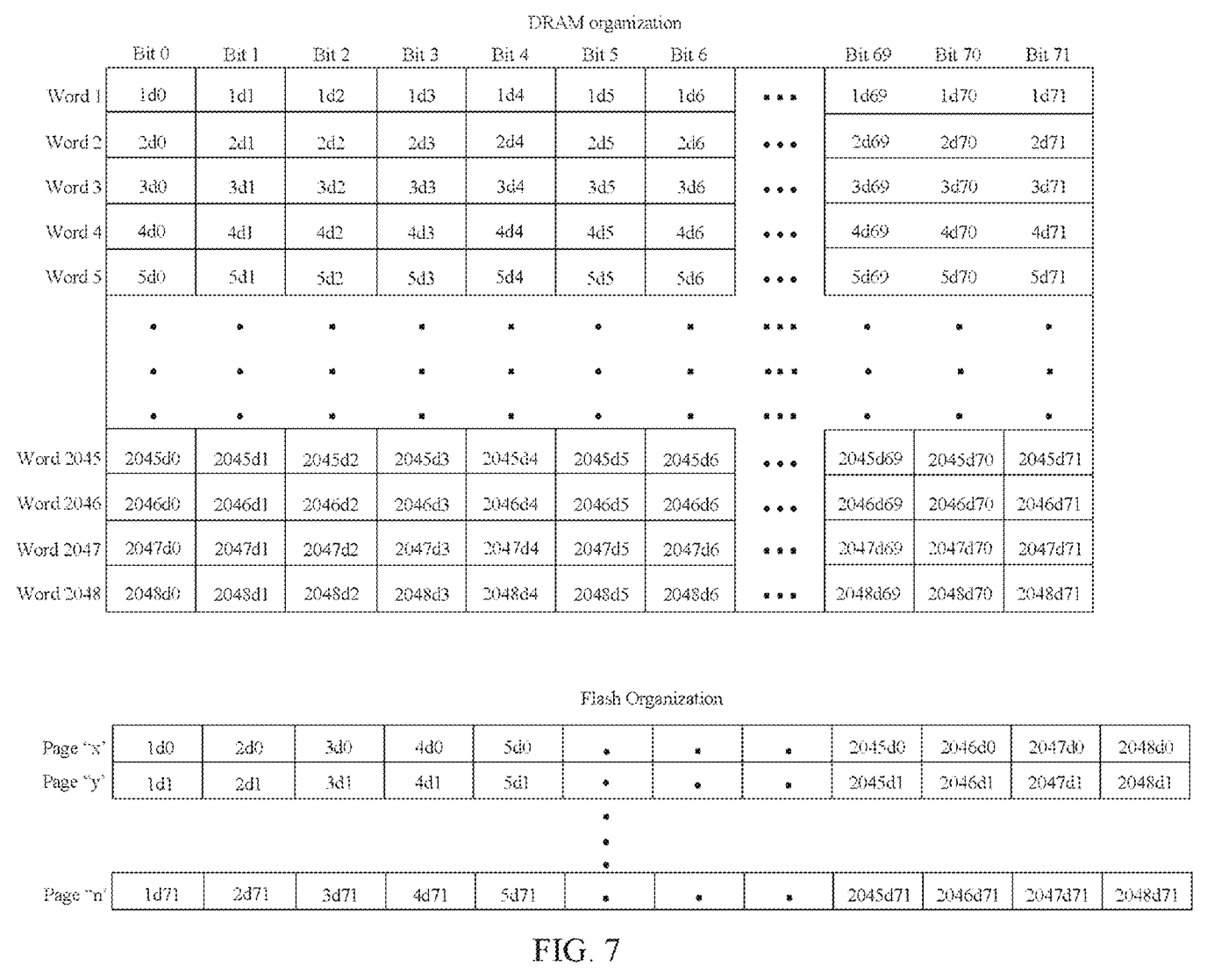

FIG. 7 is an illustration of a specific embodiment of the mapping of a DRAM memory organization to a flash memory organization. Each word of the DRAM comprises seventy-two bits in this embodiment. The illustration shows the organization of data in the DRAM as mapped to a block of data in the flash. All of the low order bits (bit 0) from 2K of DRAM words are stored sequentially in one flash page (page x), although sequential storage is not necessarily required in all embodiments. Likewise, bit 1 from the 2K DRAM words is stored in one page of the flash, in this case page y. In this example, N, the number of bits in a flash page, is two kilobits.

In one embodiment, the system operates on sixteen bit "swatches" at a time. The size of a swatch depends upon the DRAM width (in bits) and flash page size (in bits). In one example, typical values of the DRAM width and the page size are sixteen bits and two kilobits, respectively. A swatch is a number of bits equal to the product of these two values, for example 16×2 kilobits or 32 kilobits.

Working with swatches offers certain advantages. For example, it may be possible to conserve system power by operating a single DRAM device (or a small number) at a time during the backup of the contents of DRAM to flash. Those DRAM devices which are not being read for data at a given moment may be maintained in a low power mode, with a single DRAM device (or a low number) maintained in full power mode as data is read out from the device(s) to the reorder buffer. Once the data in a DRAM device has been transferred out, the device may be placed into a low power mode, and the next DRAM memory device from which data is sought may be powered up to continue the data transfer.

Figure 8:
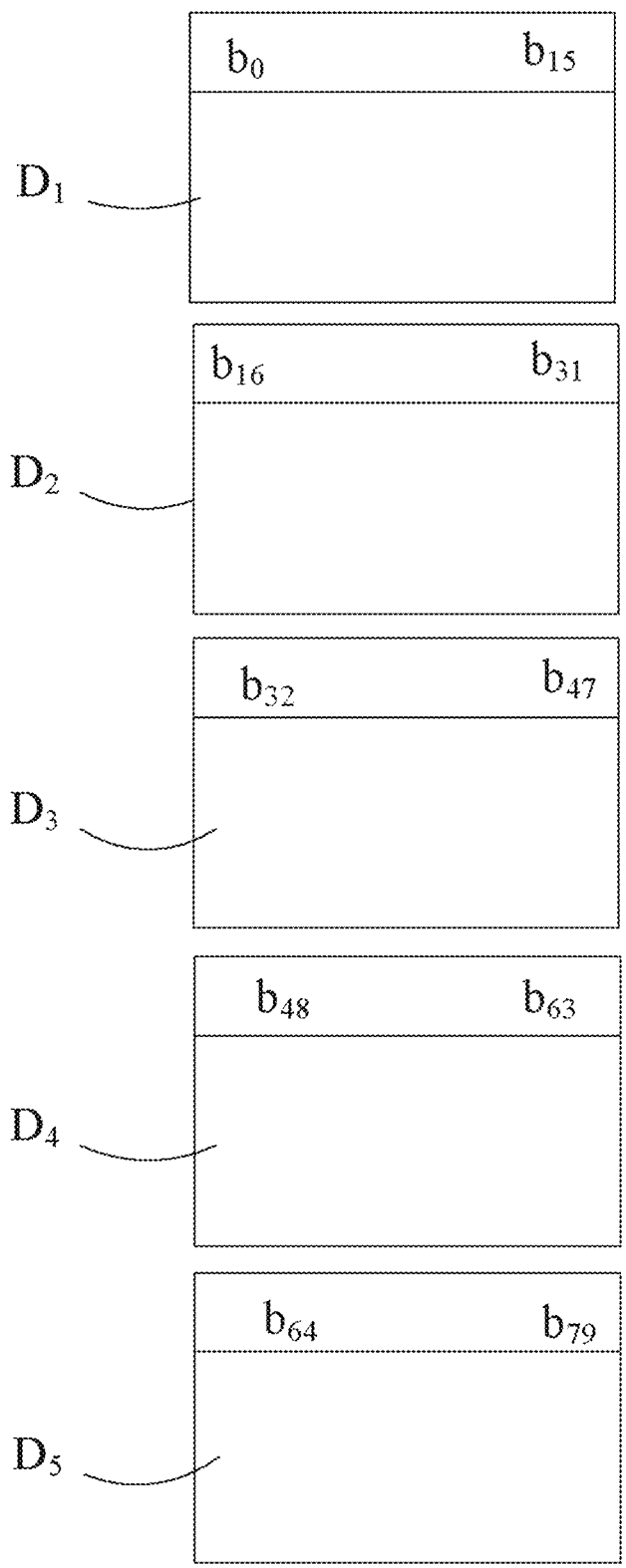
FIG. 8 is an illustration of an embodiment of an eighty bit DRAM word.

FIG. 8 is an illustration of an embodiment of an eighty bit DRAM data word. The word is stored across multiple DRAM physical devices, in this case five devices. Sixteen bits of each data word are stored in each device. In this case, sixty-four bits may be for data and sixteen bits may be used for an extended error-correcting code such as a Hamming code. In some cases a simpler error-correcting code of eight bits or so may be employed. The lower sixteen bits of a data word may be read by powering up a single one of the DRAM devices (e.g. $D_1$) and leaving the remaining devices in a low power state. All of the low order sixteen bits of the data words stored in the DRAM may be accessed by powering $D_1$ and without powering the other devices; likewise, the next sixteen bits (bits $b_{16}$-$b_{31}$) of the stored data words may be accessed by powering $D_2$ and not the other DRAM devices, and so on.

Figure 9:
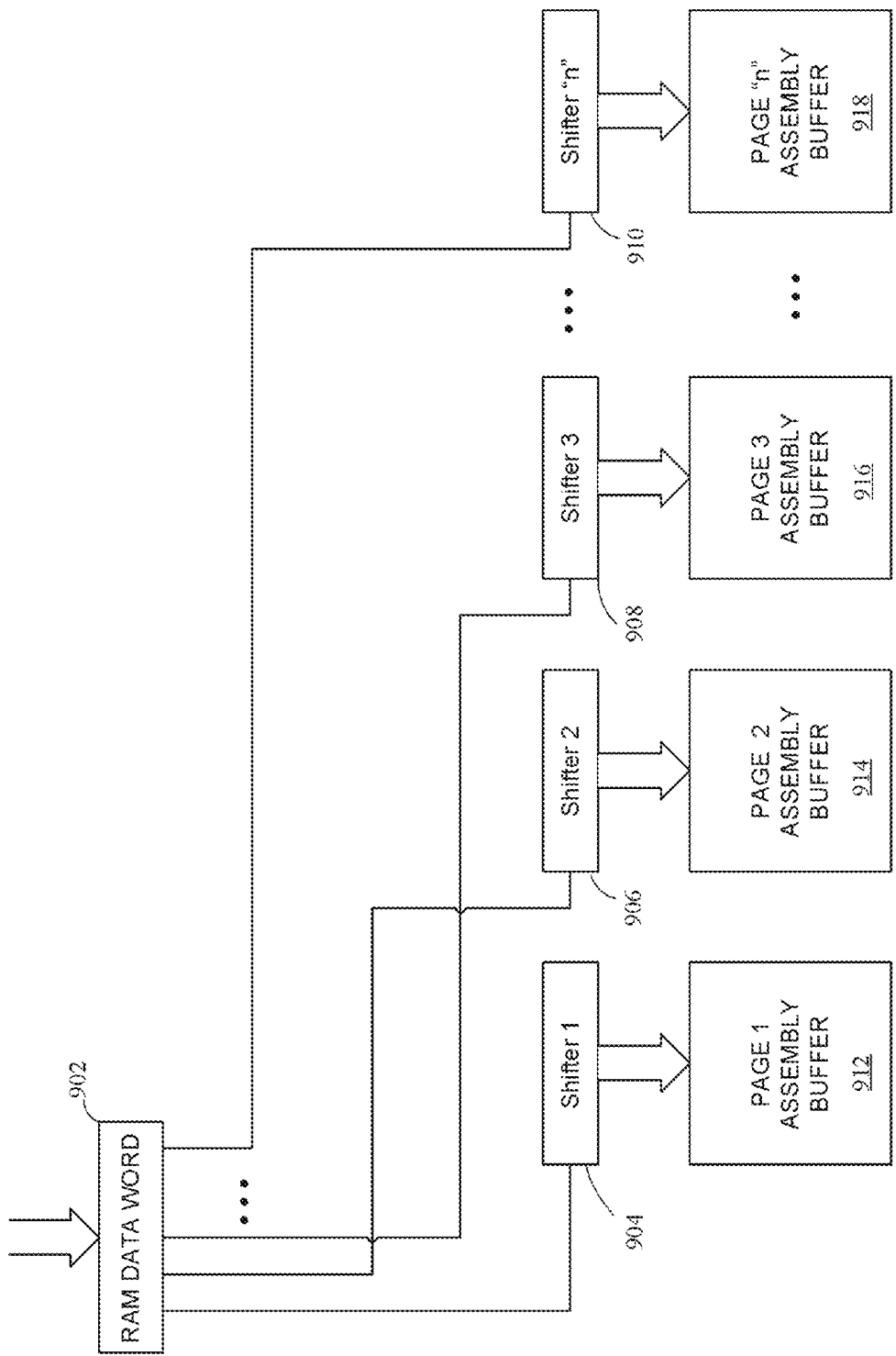
FIG. 9 illustrates an embodiment of logic to reorder bits of the DRAM into flash pages.

Logic such as the embodiment shown in FIG. 9 may be employed to reorder bits of the DRAM into flash pages. A data word from volatile memory is read into an input register 902 (not all embodiments will necessarily employ a register for this purpose). Individual bits from each position of the data word in the register 902 are shifted into corresponding shift registers 904, 906, 908 and 910. More data words are read from DRAM, and individual bits thereof shifted into the shift registers, until the shift registers store "n" pages of data. At this point each shift register stores a series of data bits each from a same bit position in the data words. Once the shift registers are full, they are written to the page buffers 912, 914, 916, and 918, and the process is repeated for another "n" pages of DRAM data. It may be possible in certain embodiments to begin the process of writing bits from the reorder buffer to flash memory before the reorder buffer is full, thus making it possible to use a smaller reorder buffer. Data may be written to single flash memory device at a time or multiple data words may be written to different flash devices in parallel to improve performance.

Alternatives and Implementations

"Logic" refers to signals and/or information embodied in circuitry (e.g. memory or other electronic or optical circuits) that may be applied to influence the operation of a device. Software, hardware, electrical and optical memory, and firmware are examples of physical structure that may embody logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A memory system comprising:
   a DRAM memory comprising a DRAM data word;
   a flash memory comprising flash memory pages;
   machine memory or circuits comprising logic to distribute across multiple of the flash memory pages different bits of the DRAM data word, the DRAM data word having a number of DRAM data word bits equal to a DRAM row width; and
   machine memory or circuits comprising logic to carry out distribution of the different bits of the DRAM data word across the flash memory pages in a sequence of swatches of bits, each swatch of the sequence of swatches having a number of bits equal to a product of the DRAM row width and a page size of the flash memory, and to change a power state of one or more DRAM devices of the DRAM memory system between distribution of the each swatch of the sequence of swatches across the flash memory pages.

2. The memory system of claim 1, the DRAM data word distributed over the flash memory pages of multiple flash memory chips of the flash memory.

3. The memory system of claim 1, a number of the flash memory pages over which the DRAM data word is distributed being equal to a number of the different bits of the DRAM data word.

4. The memory system of claim 1, wherein an error correcting code (ECC) of the DRAM data word is also distributed over the flash memory pages.

5. The memory system of claim 4, a number of flash pages over which the ECC is distributed being equal to a number of data bits of the ECC.

6. The memory system of claim 1, a number of the different bits of the DRAM data word stored in each of the flash memory pages is between one and five.

7. The memory system of claim 1, further comprising:
logic to distribute the each swatch of the sequence of swatches in a sequence such that while any one particular swatch is being distributed to the flash memory pages, only a single one of the DRAM devices of the DRAM memory system is in an active power state, and the DRAM devices of the DRAM memory system that do not comprise the particular swatch remain in a low power state.

8. A method comprising:
storing in a DRAM memory a DRAM data word;
distributing across multiple flash memory pages different bits of the DRAM data word, the DRAM data word having a number of DRAM data word bits equal to a DRAM row width; and
distributing the different bits of the DRAM data word across the flash memory pages in a sequence of swatches of bits, each swatch of the sequence of swatches having a number of bits equal to a product of the DRAM row width and a page size of the flash memory, and to change a power state of one or more DRAM devices of the DRAM memory system between distribution of the each swatch of the sequence of swatches across the flash memory pages.

9. The method of claim 8, further comprising distributing the DRAM data word over the flash memory pages of multiple flash memory chips.

10. The method of claim 8, a number of the flash memory pages over which the DRAM data word is distributed being equal to a number of the different bits of the DRAM data word.

11. The method of claim 8, wherein an error correcting code (ECC) of the DRAM data word is also distributed over the flash memory pages.

12. The method of claim 11, a number of flash pages over which the ECC is distributed being equal to a number of data bits of the ECC.

13. The method of claim 8, a number of the different bits of the DRAM data word stored in each of the flash memory pages is between one and five.

14. The method of claim 8, further comprising:
distributing the each swatch of the sequence of swatches in a sequence such that while any one particular swatch is being distributed to the flash memory pages, only a single one of the DRAM devices of the DRAM memory system is in an active power state, and the DRAM devices of the DRAM memory system that do not comprise the particular swatch remain in a low power state.

* * * * *